United States Patent
Otto

(10) Patent No.: US 10,843,967 B2
(45) Date of Patent: Nov. 24, 2020

(54) ROAD AND SURFACE COATING COMPOSITIONS AND PROCESSES THEREOF

(71) Applicant: ePave, LLC, Los Angeles, CA (US)

(72) Inventor: Rick B. Otto, Mooresville, NC (US)

(73) Assignee: ePave, LLC, Los Angeles, CA (US)

( * ) Notice: Subject to any disclaimer, the term of this patent is extended or adjusted under 35 U.S.C. 154(b) by 109 days.

(21) Appl. No.: 15/172,861

(22) Filed: Jun. 3, 2016

(65) Prior Publication Data
US 2017/0349490 A1   Dec. 7, 2017

(51) Int. Cl.
| C04B 28/04 | (2006.01) |
| C04B 28/02 | (2006.01) |
| C04B 14/06 | (2006.01) |
| C04B 18/08 | (2006.01) |
| C04B 7/02  | (2006.01) |
| C04B 24/22 | (2006.01) |
| C04B 14/30 | (2006.01) |
| C04B 111/00 | (2006.01) |

(52) U.S. Cl.
CPC ..... *C04B 28/04* (2013.01); *C04B 2111/00482* (2013.01); *Y02W 30/92* (2015.05); *Y02W 30/94* (2015.05)

(58) Field of Classification Search
CPC ....... C04B 26/125; C04B 26/12; C04B 28/04; C04B 2111/00482; C04B 28/02; C04B 14/06; C04B 18/08; C04B 2103/50; C04B 24/2641; C04B 7/02; C04B 24/223; C04B 14/303; C04B 41/483; C04B 14/30; C04B 2111/00215; Y02W 30/92; Y02W 30/94
USPC .......................................................... 524/5
See application file for complete search history.

(56) References Cited

U.S. PATENT DOCUMENTS

| 4,394,175 A | * | 7/1983 | Cheriton | ................. C04B 28/06 106/695 |
| 4,789,265 A | | 12/1988 | Wilson et al. | |
| 4,906,126 A | | 3/1990 | Wilson et al. | |
| 4,917,533 A | | 4/1990 | Wilson | |
| 5,302,051 A | | 4/1994 | Wilson, Sr. | |
| 5,735,952 A | | 4/1998 | Wilson, Sr. | |
| 5,749,674 A | | 5/1998 | Wilson, Sr. | |
| 5,947,635 A | | 9/1999 | Wilson, Sr. | |
| 5,980,664 A | | 11/1999 | Wilson, Sr. | |
| 6,020,073 A | | 2/2000 | Wilson, Sr. | |
| 6,102,615 A | | 8/2000 | Wilson, Sr. | |
| 6,624,232 B2 | | 9/2003 | Wilson, Sr. | |
| 7,714,058 B2 | | 5/2010 | Wilson, Jr. | |
| 7,963,719 B2 | | 6/2011 | Wilson, Sr. | |
| 8,113,736 B2 | | 2/2012 | Wilson, Sr. | |
| 8,567,747 B2 | | 10/2013 | Wilson, Sr. | |
| 2010/0075029 A1 | | 3/2010 | Wilson, Jr. | |
| 2010/0179251 A1 | | 7/2010 | Wilson, Sr. | |
| 2010/0310879 A1 | | 12/2010 | Wilson, Sr. | |
| 2012/0264848 A1 | | 10/2012 | Wilson, Sr. | |
| 2015/0232388 A1 | * | 8/2015 | Dal Bo | ................... C04B 28/04 106/726 |

FOREIGN PATENT DOCUMENTS

| JP | 2002308660 | * 10/2002 | ............. C04B 22/08 |
| JP | 2005239490 | *  9/2005 | ............. C04B 22/10 |

* cited by examiner

*Primary Examiner* — Ronald Grinsted
(74) *Attorney, Agent, or Firm* — The Gilbo Law Group, LLC; Jeffrey Gilbo

(57) ABSTRACT

Provided are compositions and methods thereof that may include Portland cement, a melamine, and alumina. The compositions may further include silicon dioxide, supplementary cementitious material, polymer resin(s), hydrophobizers, preservatives, film-forming assistants, dispersants, foam stabilizers, defoamers, pigments, dyes, water, or combinations thereof. Typically, the compositions are coatings that may be applied to restore and preserve asphalt and cement road surfaces and pavements.

14 Claims, No Drawings

ROAD AND SURFACE COATING COMPOSITIONS AND PROCESSES THEREOF

BACKGROUND

Deterioration of asphalt and concrete pavement naturally occurs over time due to exposure to elements such as rain, sunlight, and chemicals that come into contact with the pavement surface. To prevent deterioration and restore pavement surfaces, oil and tar-based coatings have been applied. Such coatings are also susceptible to deterioration by the same elements that affect asphalt and concrete pavements. It would be advantageous to have compositions, which may restore and preserve road surfaces and pavements including concrete and asphalt roads and walkways, but are not susceptible to such elements. In particular, it may be desirable to have coatings that comprise such compositions. It may also be desirable to provide kits that comprise the compositions for ease of application.

SUMMARY OF THE INVENTION

The present application relates generally to the field of road and walkway surface compositions and, in particular, compositions that may be used as coatings for concrete and asphalt roads and walkways. The present application provides coatings that include such compositions. In some instances the coating may have a thickness of about 1 mm to about 100 mm. Additionally, single or 2-pack coating kits are provided. The compositions may include Portland cement, a melamine, and alumina. Often, the compositions additionally include silicon dioxide, at least one supplementary cementitious material, and/or a first and/or second water redispersable powder resin or a liquid polymer emulsion. In some embodiments, the melamine may include a sulphonated melamine formaldehyde polymer. In some embodiments, the melamine may further include an acrylic polymer salt (e.g., sodium salt), a polycarboxylate ether (PCE) superplasticizer, or combinations thereof. In some embodiments, the alumina may be selected from the group consisting of crystalline aluminum oxide, amorphous aluminum oxide, calcined alumina, or combinations thereof. Additionally, the compositions may include dyes and/or pigments, and/or be compatible with a wide range of additional ingredients such a hydrophobizers, preservatives, film-forming assistants, dispersants, foam stabilizers, defoamers, or combinations thereof.

The ratio of components in the compositions may vary. In some embodiments, the ratio of alumina to Portland cement may be about 1:5 to about 1:50. In some embodiments, the ratio of melamine to Portland cement may be about 1:25 to about 1:500.

In another aspect, the present technology provides a method for production of a concrete composition, the method including: (a) blending component I; (b) adding component II; and (c) blending; wherein component I includes a melamine and alumina; and component II includes Portland cement. In some embodiments, the method may further include (d) adding silicon dioxide; and (e) blending. In some embodiments, the present technology provides coatings that include such compositions. In some embodiments, the coating may be applied to a concrete surface, asphalt surface, or other similar surface.

DETAILED DESCRIPTION

In one aspect, the composition of the present technology may include Portland cement, a melamine, and alumina. In some embodiments, the composition may further include silicon dioxide.

Commonly, the silicon dioxide may be quartz silica sand. In some embodiments, the silicon dioxide may be at least about 70% quartz silica sand. In some embodiments, the silicon dioxide may be at least about 80% quartz silica sand. In some embodiments, the silicon dioxide may be at least about 90% quartz silica sand. In some embodiments, the silicon dioxide may be at least about 100% quartz silica sand. In some embodiments, the quartz silica sand may be about 8 to about 100 mesh. In some embodiments, the quartz silica sand may be about 12 to about 60 mesh. In some embodiments, the quartz silica sand may be about 16 to about 40 mesh. In some embodiments, the quartz silica sand may be at least an average of about 10-30 mesh. In some embodiments, the quartz silica sand may be at least an average of about 20 mesh. In some embodiments, the quartz silica sand may be about 95% 20-40 mesh. In some embodiments, the quartz silica sand may be about 90% 20-40 mesh. In some embodiments, the quartz silica sand may be about 85% 20-40 mesh. In some embodiments, the quartz silica sand may be about 90% 20-40 mesh. In some embodiments, the quartz silica sand may be about 80% 20-40 mesh. In some embodiments, the quartz silica sand may be about 10-50% 20 mesh. In some embodiments, the quartz silica sand may be about 15-30% 20 mesh. In some embodiments, the quartz silica sand may be 0 to about 10% 16 mesh, about 15% to about 30% 20 mesh, about 25% to about 60% 30 mesh, about 5% to about 30% 40 mesh, about 5% to about 15% 50 mesh, 0 to about 5% 70 mesh, and about 2% to about 5% 100-270 mesh. Nonlimiting examples include Unimin Granusil 2020 (available from Unimim Corporation) and California Silica #20 (available from California Silica Sand Co.). In some embodiments, the composition may include about 50 to 80 wt % quartz based on dry components. In some embodiments, the composition may include about 55 to 75 wt % quartz based on dry components. In some embodiments, the composition may include about 57 to 67 wt % quartz based on dry components. In some embodiments, the composition may include about 30 to 80 wt % quartz based on wet and dry components. In some embodiments, the composition may include about 40 to 60 wt % quartz based on wet and dry components. In some embodiments, the composition may include about 47 to 55 wt % quartz based on wet and dry components.

Often, the composition may further include a supplementary cementitious material. In some embodiments, the supplementary cementitious material may be selected from the group consisting of pozzolans, fly ash, slags, metallurgical slags, bottom ash, chemically modified coal ash, ground glass, heat treated clays, heat treated shale, heat treated siliceous rocks, metakaolin, ground granulated blast-furnace slag (GGBFS), steel slag, natural pozzolans, artificial pozzolans, limestone, ground limestone, ground quartz, ground filler materials, biomass ash, pulverized fuel ash, calcium sulphoaluminate cement, and combinations thereof. In some embodiments, the supplementary cementitious material may be selected from the group consisting of fly ash, steel slag, silica fume, metastable forms of $CaCO_3$, ground limestone, ground quartz, precipitated $CaCO_3$, calcium sulphoaluminate cement, and combinations thereof. In some embodiments, the supplementary cementitious material may be fly ash. In some embodiments, the fly ash may be Class C or F fly ash. In some embodiments, the composition may include about 2 to 15 wt % supplementary cementitious material based on dry components. In some embodiments, the composition may include about 5 to 12 wt % supplementary cementitious material based on dry components. In some embodiments, the composition may include about 7 to 9 wt % supplementary cementitious material based on dry components. In some embodiments, the composition may include about 3 to 10 wt % supplementary cementitious material based on wet and dry components. In some embodiments, the composition may include about 5.5 to 7.5 wt % supplementary cementitious material based on wet and dry components.

In some embodiments, the Portland cement may be selected from the group consisting of Type I, Type II, and combinations thereof. In some embodiments, the Portland cement may be Type I/II. In some embodiments, the composition may include about 5 to 50 wt % Portland cement based on dry components. In some embodiments, the composition may include about 10 to 40 wt % Portland cement based on dry components. In some embodiments, the composition may include about 15 to 30 wt % Portland cement based on dry components. In some embodiments, the composition may include about 20 to 25 wt % Portland cement based on dry components. In some embodiments, the composition may include about 5 to 30 wt % Portland cement based on wet and dry components. In some embodiments, the composition may include about 12 to 25 wt % Portland cement based on wet and dry components. In some embodiments, the composition may include about 16 to 21 wt % Portland cement based on wet and dry components.

In some embodiments, the melamine may be that of Formula A:

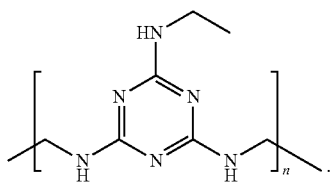

In some embodiments, the melamine may include a sulphonated melamine formaldehyde polymer. In some embodiments, the sulphonated melamine formaldehyde may be a powder. In some embodiments, the sulphonated melamine formaldehyde may be a sprayed dried powder. Nonlimiting examples include Melment F-10 (available from BASF) and Peramin SMF10 (available from Kerneous SA). In some embodiments, the ratio of melamine to Portland cement may be about 1:25 to about 1:500. In some embodiments, the ratio of Portland cement to melamine may be about 1:40 to about 1:400. In some embodiments, the ratio of Portland cement to melamine may be about 1:50 to about 1:200. In some embodiments, the melamine may further include an acrylic polymer salt (e.g., sodium salt), a polycarboxylate ether (PCE) superplasticizer, or combinations thereof. In some embodiments, the composition may include about 0.1 to 5 wt % melamine based on dry components. In some embodiments, the composition may include about 0.2 to 3 wt % melamine based on dry components. In some embodiments, the composition may include about 0.25 to 1 wt % melamine based on dry components. In some embodiments, the composition may include about 0.05 to 5 wt % melamine based on wet and dry components. In some embodiments, the composition may include about 0.1 to 3 wt % melamine based on wet and dry components. In some embodiments, the composition may include about 0.2 to 1 wt % melamine based on wet and dry components.

In some embodiments, the alumina may be selected from the group consisting of crystalline aluminum oxide, amorphous aluminum oxide, calcined alumina, or combinations thereof. In some embodiments, the alumina may be calcined. In some embodiments, the alumina may be aluminum oxide. In some embodiments, the aluminum oxide may be crystalline. In some embodiments, the aluminum oxide may be amorphous. In some embodiments, the aluminum oxide may be a powder. In some embodiments, the aluminum oxide may be a slurry. In some embodiments, the alumina may have a median particle size of about 5-30 μm. In some embodiments, the alumina may have a median particle size of about 10-20 μm. Nonlimiting examples include PURAL (available from Sasol), CATAPAL (available from Sasol), AD-90 Alumina (available from CoorsTek), Hexion Axilat SA 502 (available from Momentive Performance Materials), Byk NANOBYK-3603 (available from Altana AG), and NABALOX (available from Nabaltec GmbH). In some embodiments, the ratio of alumina to Portland cement may be about 1:5 to about 1:50. In some embodiments, the ratio of Portland cement to alumina may be about 1:10 to about 1:30. In some embodiments, the ratio of Portland cement to alumina may be about 1:15 to about 1:25. In some embodiments, the composition may include about 0.1 to 10 wt % alumina based on dry components. In some embodiments, the composition may include about 0.5 to 5 wt % alumina based on dry components. In some embodiments, the composition may include about 1 to 2.5 wt % alumina based on dry components. In some embodiments, the composition may include about 0.5 to 2.5 wt % alumina based on dry components. In some embodiments, the composition may include about 0.2 to 5 wt % alumina based on wet and dry components. In some embodiments, the composition may include about 0.5 to 3 wt % alumina based on wet and dry components. In some embodiments, the composition may include about 0.8 to 2 wt % alumina based on wet and dry components.

In some embodiments, the ratio of melamine to Portland cement may produce a composition that is semi self-leveling and flowable with a reduced water demand, which increases compressive and/or flexural strengths. In some embodiments, the compressive strength is at least about 3% greater than the composition with no melamine. In some embodiments, the compressive strength is at least about 5% greater than the composition with no melamine. In some embodiments, the compressive strength is at least about 7% greater than the composition with no melamine. In some embodiments, the compressive strength is about 3% to 30% greater than the composition with no melamine. In some embodiments, the compressive strength is about 5% to 20% greater than the composition with no melamine. In some embodiments, the compressive strength is about 7% to 15% greater than the composition with no melamine. In some embodiments, the flexural strength is at least about 2% greater than the composition with no melamine. In some embodiments, the flexural strength is at least about 3% greater than the composition with no melamine. In some embodiments, the flexural strength is at least about 4% greater than the composition with no melamine. In some embodiments, the flexural strength is about 2% to 20% greater than the composition with no melamine. In some embodiments, the flexural strength is about 3% to 15% greater than the composition with no melamine. In some embodiments, the flexural strength is about 4% to 12% greater than the composition with no melamine. In some embodiments, the ratio of alumina to Portland cement may produce a composition that is rapid setting and non-shrink. In some embodiments, the shrinkage is less than about 0.1%. In some embodiments, the shrinkage is less than about 0.05%. In some embodiments, the shrinkage is less than about 0.04%. In some embodiments, the shrinkage is less than about 0.03%. In some embodiments, the shrinkage is less than about 0.02%. In some embodiments, the shrinkage is less than about 0.01%.

The composition may further include a first water redispersable resin. In some embodiments, the first water dispersible resin may be a powder. In some embodiments, the first water redispersable powder resin may include the polymerized monomers of styrene; and one or more monomers selected from the group consisting of vinyl ester, acrylic acid, methacrylic acid, and acrylate. In some embodiments, the composition may include about 0.1 to 10 wt % of the first water redispersable resin based on dry components. In some embodiments, the composition may include about 0.5 to 5 wt % of the first water redispersable resin based on dry components. In some embodiments, the composition may include about 1 to 3.25 wt % of the first water redispersable resin based on dry components.

In some embodiments, the acrylate may be selected from the group consisting of methyl acrylate, ethyl acrylate, n-propyl acrylate, i-propyl acrylate, n-butyl acrylate, s-butyl acrylate, butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and combinations thereof. In some embodiments, the vinyl ester may be selected from the group consisting of vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 9 to 11 carbon atoms, and combinations thereof. In some embodiments, the first water redispersable powder resin may include the polymerized monomers of styrene and acrylate. In some embodiments, the acrylate may be n-butyl acrylate. In some embodiments, the first water redispersable powder resin may have a solids content of at least about 85%. In some embodiments, the first water redispersable powder resin may have a solids content of at least about 90%. In some embodiments, the first water redispersable powder resin may have a solids content of at least about 95%. In some embodiments, the first water redispersable powder resin may have a solids content of about 98-100%. Nonlimiting examples include Wacker Vinnapas 2012E (available from Brenntag Specialties) and Acronal 430P (available from BASF).

The composition may further include a second water redispersable resin. In some embodiments, the composition may include about 0.1 to 10 wt % of the second water redispersable resin based on dry components. In some embodiments, the composition may include about 0.5 to 5 wt % of the second water redispersable resin based on dry components. In some embodiments, the composition may include about 1 to 3 wt % of the second water redispersable resin based on dry components. In some embodiments, the second water dispersible resin may be a powder. In some embodiments, the second water redispersable powder resin may include the polymerized monomers of ethylene; and one or more monomers selected from the group consisting of vinyl acetate, acrylic acid, methacrylic acid, and acrylate. In some embodiments, the acrylate may be selected from the group consisting of methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and combinations thereof. In some embodiments, the vinyl ester may be selected from the group consisting of vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 9 to 11 carbon atoms, and combinations thereof. In some embodiments, the second water redispersable powder resin may include the polymerized monomers of ethylene and vinyl acetate. In some embodiments, the second water redispersable powder resin may have a solids content of at least about 85%. In some embodiments, the second water redispersable powder resin may have a solids content of at least about 90%. In some embodiments, the second water redispersable powder resin may have a solids content of at least about 95%. In some embodiments, the second water redispersable powder resin may have a solids content of about 98-100%. Nonlimiting examples include Cemplete RP3420 M (available from Azelis Americas) and Wacker Vinnepas 5044n (available from Brenntag Specialties).

In some embodiments, the composition may include an acrylic polymer. In some embodiments, the composition may include about 1 to 25 wt % of the acrylic polymer based on wet and dry components. In some embodiments, the composition may include about 5 to 15 wt % of the acrylic polymer based on wet and dry components. In some embodiments, the composition may include about 10 to 12 wt % of the acrylic polymer based on wet and dry components. In some embodiments, the acrylic polymer may be a carboxylated acrylic copolymer. In some embodiments, the acrylic polymer may have a solids content of at least about 30 wt %. In some embodiments, the acrylic polymer may have a solids content of at least about 35 wt %. In some embodiments, the acrylic polymer may have a solids content of at least about 40 wt %. In some embodiments, the acrylic polymer may have a solids content of about 40-60 wt %. In some embodiments, the acrylic polymer may have a solids content of about 45-50 wt %. In some embodiments, the acrylic polymer may have a solids content of about 46-48 wt %. In some embodiments, the acrylic polymer may include a small amount of ammonia. In some embodiments, the acrylic polymer may include a less than about 0.2 wt % ammonia. In some embodiments, the acrylic polymer may include a small amount of butyl acrylate. In some embodiments, the acrylic polymer may include a less than about 200 ppm butyl acrylate. In some embodiments, the acrylic polymer may include about 40-60 wt % water. Nonlimiting examples include Rovene 6023 (available from Mallard Creek Polymers) and Arkema Encore 413 (available from Arkema).

Additionally, the compositions may include dyes and/or pigments, and/or be compatible with a wide range of additional ingredients such a hydrophobizers, preservatives, film-forming assistants, dispersants, foam stabilizers, defoamers, or combinations thereof.

In some embodiments, the composition may include about 0 to 15 wt % of one or more dyes and/or pigments based on dry components. In some embodiments, the composition may include about 0.1 to 10 wt % of one or more dyes and/or pigments based on dry components. In some embodiments, the composition may include about 1 to 5 wt % of one or more dyes and/or pigments based on dry components. In some embodiments, the composition may include about 1.5 to 4 wt % of one or more dyes and/or pigments based on dry components. In some embodiments, the composition may include about 1 to 2.5 wt % of one or more dyes and/or pigments based on dry components. In some embodiments, the composition may include about 0.2 to 5 wt % of one or more dyes and/or pigments based on wet and dry components. In some embodiments, the composition may include about 1 to 2.5 wt % of one or more dyes and/or pigments based on wet and dry components. In some embodiments, the composition may include about 0.5 to 1.5 wt % of one or more dyes and/or pigments based wet and on dry components. In some embodiments, the dyes and/or pigments may include titanium dioxide, carbon black, or combinations thereof. Nonlimiting examples include modified rutile titanium dioxide crystals, such as Huntsman Altiris 550 and Cristal TiONa 128, rutile titanium dioxide dispersion, such as Eagle Specialty Products WB 1106, wettable carbon black powder, such as Rockwood Davis 807 and Lansco 490-P, and carbon black dispersion, such as Eagle Specialty Products WB 1900M.

In some embodiments, the composition may include about 0.01 to 5 wt % of one or more dispersants based on dry components. In some embodiments, the composition may include about 0.1 to 1.5 wt % of one or more dispersants based on dry components. In some embodiments, the composition may include about 0.3 to 0.8 wt % of one or more dispersants based on dry components. Nonlimiting examples include polymetric dispersant powder, such as Eagle Specialty Products SuperSperse Dry and BASF Dispex CX 4910.

In some embodiments, the composition may include about 0.01 to 5 wt % of one or more defoamers based on dry components. In some embodiments, the composition may include about 0.05 to 1.5 wt % of one or more defoamers based on dry components. In some embodiments, the composition may include about 0.2 to 0.8 wt % of one or more defoamers based on dry components. In some embodiments, the composition may include about 0.02 to 1 wt % of one or more defoamers based on wet and dry components. In some embodiments, the composition may include about 0.04 to 0.3 wt % of one or more defoamers based on wet and dry components. Nonlimiting examples include Enterprise Specialty Products Foam-A-Tac FC 508, Hexion Axilat DF775 DD, Munzing Agitan 783, and New London Chemicals C-2722.

The composition may further include water.

In some embodiments, the composition may include 0 to 20 wt % water based on wet and dry components. In some embodiments, the composition may include about 0 to about 10 wt % water based on wet and dry components. In some embodiments, the composition may include about 1 wt % to 20 wt % water based on wet and dry components. In some embodiments, the composition may include about 2 to about 15 wt % water based on wet and dry components. In some embodiments, the composition may include about 2.5 to about 10 wt % water based on wet and dry components. In some embodiments, the composition may include about 3 to about 5.5 wt % water based on wet and dry components. In some embodiments, the composition may include about 3.5 to about 5 wt % water based on wet and dry components.

In some embodiments, the composition may include about 5 wt % to 30 wt % water. In some embodiments, the composition may include about 10 wt % to 20 wt % water. In some embodiments, the composition may include about 13 wt % to 18 wt % water. In some embodiments, the composition may include about 14.5 wt % water.

In one aspect, the present technology provides a coating that includes any of compositions provided herein. In some embodiments, the coating may have a thickness of about 1 mm to about 100 mm. In some embodiments, the coating may have a thickness of less than about 1 mm to about 25 mm. In some embodiments, the coating may have a thickness of less than about 10 mm. In some embodiments, the coating may have a thickness of less than about 5 mm. In some embodiments, the coating may have a thickness of less than about 4 mm. In some embodiments, the coating may have a thickness of less than about 3 mm. In some embodiments, the coating may have a thickness of about 2.5 mm to about 0.5 mm.

In another aspect, the present technology provides a single pack coating kit that includes Portland cement, a melamine, and alumina as described herein. In some embodiments, the single pack may further include silicon dioxide as described herein. Often, the pack may further include a supplementary cementitious material as described herein (e.g., fly ash).

In some embodiments, the single pack may include about 10-40 wt % Portland cement, about 0.01-5 wt % melamine, and about 0.1-10 wt % alumina. In some embodiments, the single pack may include about 20-25 wt % Portland cement, about 0.25-1.0 wt % melamine, and about 0.5-2.5 wt % alumina. In some embodiments, the single pack may include about 40-80 wt % silicon dioxide. In some embodiments, the single pack may include about 57-67 wt % silicon dioxide. In some embodiments, the single pack may include about 3-15 wt % supplementary cementitious material. In some embodiments, the single pack may include about 7-9 wt % supplementary cementitious material.

The first pack may further include a first water redispersable resin, second water redispersable resin, or combinations thereof as described herein. In some embodiments, the first pack may further include both a first water redispersable resin and a second water redispersable resin as described herein.

In some embodiments, the single pack may include about 0.1-10 wt % of the first redispersible resin described herein. In some embodiments, the single pack may include about 1-3.25 wt % of the first redispersible resin described herein. In some embodiments, the single pack may include about 0.1-10 wt % of the second redispersible resin described herein. In some embodiments, the single pack may include about 1-3 wt % of the second redispersible resin described herein.

In some embodiments, the single pack may further include hydrophobizers, preservatives, film-forming assistants, dispersants, foam stabilizers, defoamers, pigment, dye, or combinations thereof as described herein.

In some embodiments, the single pack may include about 0.05-5 wt % of a defoamer as described herein. In some embodiments, the single pack may include about 0.2-0.8 wt % of a defoamer as described herein. In some embodiments, the defoamer may be a powder. In some embodiments, the single pack may include about 0.05-5 wt % of a dispersant as described herein. In some embodiments, the single pack may include about 0.3-0.8 wt % of a dispersant as described herein. In some embodiments, the dispersant may be a powder. In some embodiments, the single pack may include about 0.1-10 wt % of titanium dioxide as described herein. In some embodiments, the single pack may include about 1-4 wt % of titanium dioxide as described herein. In some embodiments, the titanium dioxide may be crystalline. In some embodiments, the single pack may include about 0.1-10 wt % of carbon black as described herein. In some embodiments, the single pack may include about 1-2.5 wt % of carbon black as described herein. In some embodiments, the carbon black may be wettable powder.

In some embodiments, water may be added to the single pack. In some embodiments, about 5 wt % to 30 wt % water may be added and mixed to produce a composition. In some embodiments, about 10 wt % to 20 wt % water may be added. In some embodiments, about 13 wt % to 18 wt % water may be added. In some embodiments, about 14.5 wt % water may be added.

In another aspect, the present technology provides a 2-pack coating kit that includes a first pack that includes Portland cement, a melamine, and alumina as described herein; and a second pack that includes an acrylic polymer. In some embodiments, the first pack may include about 10-40 wt % Portland cement, about 0.01-5 wt % melamine, and about 0.1-10 wt % alumina. In some embodiments, the first pack may include about 20-25 wt % Portland cement, about 0.25-1 wt % melamine, and about 1-2.5 wt % alumina as described herein. In some embodiment, the second pack may include about 50-80 wt % acrylic polymer. In some embodiment, the second pack may include about 62-70 wt % acrylic polymer.

In some embodiments, the first pack may further include silicon dioxide as described herein. Often, the first pack may further include a supplementary cementitious material as described herein (e.g., fly ash). In some embodiments, the first pack may include about 40-80 wt % silicon dioxide. In some embodiments, the first pack may include about 57-67 wt % silicon dioxide. In some embodiments, the first pack may include about 3-15 wt % supplementary cementitious material. In some embodiments, the first pack may include about 7-9 wt % supplementary cementitious material.

In some embodiments, the second pack may further include hydrophobizers, preservatives, film-forming assistants, dispersants, foam stabilizers, defoamers, pigment, dye, or combinations thereof as described herein.

In some embodiments, the second pack may include about 0.05-5 wt % of a defoamer as described herein. In some embodiments, the second pack may include about 0.25-1.5 wt % of a defoamer as described herein. In some embodiments, the defoamer may be a liquid. In some embodiments, the second pack may include about 5-15 wt % of titanium dioxide as described herein. In some embodiments, the second pack may include about 7-12 wt % of titanium dioxide as described herein. In some embodiments, the titanium dioxide may be a dispersion. In some embodiments, the second pack may include about 0.1-10 wt % of carbon black as described herein. In some embodiments, the second pack may include about 4-8 wt % of carbon black as described herein. In some embodiments, the carbon black may be a dispersion.

In some embodiments, the second pack may include water. In some embodiments, the second pack may include about 10-40 wt % water. In some embodiments, the second pack may include about 20-28 wt % water.

In some embodiments, the weight ratio of the first pack to the second pack is about 10:1 to about 1:10. In some embodiments, the weight ratio of the first pack to the second pack is about 10:1 to about 1:1. In some embodiments, the weight ratio of the first pack to the second pack is about 9:1 to about 2:1. In some embodiments, the weight ratio of the first pack to the second pack is about 7:1 to about 5:1. In some embodiments, the weight ratio of the first pack to the second pack is about 6:1 to about 5.5:1. In some embodiments, the weight ratio of the first pack to the second pack is about 5.75:1. In some embodiments, the first pack may include about 50 pounds and to the second pack may include about 120 fluid ounces. In some embodiments, after mixing the first pack and the second pack together and additional water may be added. In some embodiments, 0 to about 10 wt % additional water may be added.

In one aspect, the present technology provides a method for production of a concrete composition, the method including: (a) blending component I; (b) adding component II; and (c) blending; wherein component I includes a melamine and alumina as described herein; and component II includes Portland cement as described herein. In some embodiments, the method may further include: (d) adding silicon dioxide as described herein; and (e) blending.

In some embodiments, the blending temperature may be below about 200° F. In some embodiments, the blending temperature may be below about 180° F. In some embodiments, the blending temperature may be less than or equal to about 160° F.

In some embodiments, component II may further include a supplementary cementitious material as described herein.

In some embodiments, the ratio of melamine to Portland cement may be about 1:25 to about 1:500. In some embodiments, the ratio of Portland cement to melamine may be about 1:40 to about 1:400. In some embodiments, the ratio of Portland cement to melamine may be about 1:50 to about 1:200. In some embodiments, the ratio of alumina to Portland cement may be about 1:5 to about 1:50. In some embodiments, the ratio of Portland cement to alumina may be about 1:10 to about 1:30. In some embodiments, the ratio of Portland cement to alumina may be about 1:15 to about 1:25.

In some embodiments, component II may further include a first water redispersable resin, second water redispersable resin, or combinations thereof as described herein. In some embodiments, component II may further include both a first water redispersable resin and a second water redispersable resin as described herein.

In some embodiments, component I may further include hydrophobizers, preservatives, film-forming assistants, dispersants, foam stabilizers, defoamers, or combinations thereof as described herein.

In some embodiments, the method may further include: (f) adding component IIIA or IIIB; and (g) blending; wherein component IIIA includes water and component IIIB includes an acrylic polymer as described herein.

In some embodiments, component IIIB may further include hydrophobizers, preservatives, film-forming assistants, dispersants, foam stabilizers, defoamers, or combinations thereof as described herein. In some embodiments, component IIIB may further include water. In some embodiments, the about 20 wt % to 30 wt % water may be included.

In some embodiments, component I and/or component IIIB may further pigments and/or dyes as described herein.

In some embodiments, the blender may be a horizontal-shaft ribbon blender, horizontal-shaft paddle blender, twin-shell blender (V-blender), twin-shaft paddle blender, twin-shaft ribbon blender, double cone blender, pneumatic gravity blender, or any other blender known to those skilled in the art.

In some embodiments, water or additional water may be added to the blended components and mixed. In some embodiments, about 0 to about 10 wt % water may be added. In some embodiments, the about 5 wt % to 30 wt % water may be added. In some embodiments, about 10 wt % to 20 wt % water may be added. In some embodiments, about 13 wt % to 18 wt % water may be added. In some embodiments, about 14.5 wt % water may be added.

In some embodiments, the blended components may be applied to a pavement surface such as an asphalt or concrete surface. In some embodiments, the application includes applying the composition as a coating. In some embodiments, the coating may have a thickness of about 1 mm to about 100 mm. In some embodiments, the coating may have a thickness of less than about 1 mm to about 25 mm. In some embodiments, the coating may have a thickness of less than about 10 mm. In some embodiments, the coating may have a thickness of less than about 5 mm. In some embodiments, the coating may have a thickness of less than about 4 mm. In some embodiments, the coating may have a thickness of less than about 3 mm. In some embodiments, the coating may have a thickness of about 2.5 mm to about 0.5 mm. In some embodiments, the coating may be cured for about 10 minutes to about 8 hours. In some embodiments, the coating may be cured for about 15 minutes to about 6 hours. In some embodiments, the coating may be cured for about 15 minutes to about 3 hours. In some embodiments, the coating may be cured for about 15 minutes to about 1 hour. In some embodiments, the coating may be cured for about 15 minutes to about 45 minutes. In some embodiments, the coating may be cured for about 30 minutes to about 7 hours. In some embodiments, the coating may be cured for about 1 hour to about 6 hours. In some embodiments, the coating may be cured for about 2 hours to about 4 hours.

EXAMPLES

The following examples are intended to more specifically illustrate the present coating compositions according to various embodiments described above. These examples should in no way be construed as limiting the scope of the present technology.

Example 1. Two-Pack Kit System

Components 1-5 of Table 1 were combined in powder blending equipment. The mixture was blended for 3-5 minutes until a lump-free, homogenous consistency was achieved to provide Mixture A. Component 6 was then added to a second mixing vessel equipped with an impeller shaft. The second mixing vessel was started at a slow speed and slowly increased until a small vortex formed around the impeller shaft. Component 7 was then slowly added to the second mixing vessel and the components were blended for 5-6 minutes while maintaining the vortex around the impeller shaft. Components 8 and/or 9 were then slowly added to the second mixing vessel and the mixture was blended an additional 4-5 minutes while maintaining the vortex around the impeller shaft. The speed of the mixer was then reduced until the vortex collapsed. Component 10 was then added and the mixture was blended an additional 2-3 minutes to provide Mixture B. At the construction site, 50 pounds of Mixture A and 120 fluid ounces of Mixture B were combined and blended 2-4 minutes or until the consistency was homogenous and lump-free. If greater flowability and/or workability are necessary, water can be added. The product was then applied to the pavement surface at a thickness of 1.5-2 mm and allowed to cure for 30-480 minutes.

TABLE 1

| Component No. | Component | Wt % |
|---|---|---|
| 1 | Ordinary Portland Cement Type I/II | 20-25% |
| 2 | Fly Ash Class C or F | 7-9% |
| 3 | 20 Mesh Quartz Silica Sand | 57-67% |
| 4 | Spray Dried Sulphonated Melamine Powder | 0.25-1.0% |
| 5 | Alumina | 1.0-2.50% |
| 6 | Carboxylated Acrylic Copolymer Emulsion | 62-70% |
| 7 | 3-Dimensional Siloxane Defoamer Liquid | 0.25-1.50% |
| 8 | Rutile Titanium Dioxide Dispersion | 7-12% |
| 9 | Carbon Black Dispersion | 4-8% |
| 10 | Water | 20-28% |

Example 2. Single Pack Kit System

Components 1-4 and 9 and/or 10 of Table 2 were combined in powder blending equipment. The mixture was blended for 5-6 minutes until a lump-free, homogenous consistency was achieved. Components 5-8 were then added and the mixture was blended an additional 1-2 minutes. Next, component 11 was added and the mixture was blended an additional 3-5 minutes resulting in a dry blend. During the blending, the temperature of the mixture was monitored and not allowed to exceed 160° F. At the construction site, 14.5 wt % water based on the dry blend was added to the mixture and blended 2-4 minutes or until the consistency was homogenous and lump-free. The product was then applied to the pavement surface at a thickness of 1.5-2 mm and allowed to cure for 30-300 minutes.

TABLE 2

| Component No. | Component | Wt % |
|---|---|---|
| 1 | Spray Dried Sulphonated Melamine Powder | 0.25-1.0% |
| 2 | Sodium Magnesium Aluminosilicate Defoamer Powder | 0.2-0.8% |
| 3 | Polymetric Dispersant Powder | 0.3-0.8% |
| 4 | Alumina | 0.5-2.5% |
| 5 | Ordinary Portland Cement Type I/II | 20-25% |
| 6 | Fly Ash Class C or F | 7-9% |
| 7 | Redispersible Acrylic Acid Ester Copolymer Powder | 1.0-3.25% |
| 8 | Redispersible Vinyl Acetate and Ethylene Copolymer Powder | 1.0-3.0% |
| 9 | Modified Rutile Titanium Dioxide Crystals | 1.5-4.0% |
| 10 | Wettable Carbon Black Powder | 1.0-2.5% |
| 11 | 20 Mesh Quartz Silica Sand | 57-67% |

Illustrative Embodiments

Reference is made in the following to a number of illustrative embodiments of the subject matter described herein. The following embodiments describe illustrative embodiments that may include various features, characteristics, and advantages of the subject matter as presently described. Accordingly, the following embodiments should not be considered as being comprehensive of all of the possible embodiments or otherwise limit the scope of the methods, materials and compositions described herein.

In one aspect, the present technology provides a composition that includes Portland cement, a melamine, and alumina.

In some embodiments, the composition may further include silicon dioxide. The silicon dioxide may be quartz silica sand. In some embodiments, the quartz silica sand may be about 8 to 100 mesh. In some embodiments, the quartz silica sand may be about 16 to 70 mesh.

In some embodiments, the composition may further include a supplementary cementitious material. The supplementary cementitious material may be selected from the group consisting of pozzolans, fly ash, slags, metallurgical slags, bottom ash, chemically modified coal ash, ground glass, heat treated clays, heat treated shale, heat treated siliceous rocks, metakaolin, ground granulated blast-furnace slag (GGBFS), steel slag, natural pozzolans, artificial pozzolans, limestone, ground limestone, ground quartz, ground filler materials, biomass ash, pulverized fuel ash, calcium sulphoaluminate cement, and combinations thereof. In some embodiments, the supplementary cementitious material may be selected from the group consisting of fly ash, steel slag, silica fume, metastable forms of $CaCO_3$, ground limestone, ground quartz, precipitated $CaCO_3$, calcium sulphoaluminate cement, and combinations thereof. In some embodiments, the supplementary cementitious material may be fly ash. In some embodiments, the fly ash may be Class C or F fly ash.

In some embodiments, the Portland cement may be selected from the group consisting of Type I, Type II, and combinations thereof.

In some embodiments, the melamine may include a sulphonated melamine formaldehyde polymer. In some embodiments, the ratio of melamine to Portland cement may be about 1:25 to about 1:500. In some embodiments, the ratio of Portland cement to melamine may be about 1:40 to about 1:400. In some embodiments, the ratio of Portland cement to melamine may be about 1:50 to about 1:200.

In some embodiments, the alumina may be selected from the group consisting of crystalline aluminum oxide, amorphous aluminum oxide, calcined alumina, or combinations thereof. In some embodiments, the alumina may be calcined. In some embodiments, the alumina may be aluminum oxide. In some embodiments, the aluminum oxide may be crystalline. In some embodiments, the aluminum oxide may be amorphous. In some embodiments, the aluminum oxide may be a powder. In some embodiments, the aluminum oxide may be a slurry. In some embodiments, the ratio of alumina to Portland cement may be about 1:5 to about 1:50. In some embodiments, the ratio of Portland cement to alumina may be about 1:10 to about 1:30. In some embodiments, the ratio of Portland cement to alumina may be about 1:15 to about 1:25.

In one embodiment, the composition may further include a first water redispersable powder resin. The first water redispersable powder resin may include the polymerized monomers of styrene; and one or more monomers selected from the group consisting of vinyl ester, acrylic acid, methacrylic acid, and acrylate. In some embodiments, the acrylate may be selected from the group consisting of methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and combinations thereof. In some embodiments, the vinyl ester may be selected from the group consisting of vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 9 to 11 carbon atoms, and combinations thereof. In some embodiments, the first water redispersable powder resin may include the polymerized monomers of styrene and acrylate. In some embodiments, the acrylate may be n-butyl acrylate.

The composition may further include a second water redispersable powder resin. In some embodiments, the second water redispersable powder resin includes the polymerized monomers of ethylene; and one or more monomers selected from the group consisting of vinyl acetate, acrylic acid, methacrylic acid, and acrylate. In some embodiments, the acrylate may be selected from the group consisting of methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and combinations thereof. In some embodiments, the vinyl ester may be selected from the group consisting of vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 9 to 11 carbon atoms, and combinations thereof. In some embodiments, the second water redispersable powder resin may include the polymerized monomers of ethylene and vinyl acetate.

In another embodiment, the composition may further include an acrylic polymer. In some embodiments, the acrylic polymer may be a carboxylated acrylic copolymer. In some embodiments, the acrylic polymer may have a solids content of about 40-60 wt %. In some embodiments, the acrylic polymer may have a solids content of about 46-48 wt %. In some embodiments, the acrylic polymer may include a less than about 0.2 wt % ammonia. In some embodiments, the acrylic polymer may include a less than about 200 ppm butyl acrylate. In some embodiments, the acrylic polymer may include about 40-60 wt % water.

In some embodiments, the composition may further include water. In some embodiments, the composition may further include hydrophobizers, preservatives, film-forming assistants, dispersants, foam stabilizers, defoamers, or combinations thereof. In some embodiments, the composition may further include pigments and/or dyes. In some embodiments, the pigment may be selected from the group consisting of titanium dioxide, carbon black, inorganic iron oxides, and combinations thereof.

In another aspect, the present technology provides coatings the include the compositions. In some embodiments, the coating may have a thickness of about 1 mm to about 100 mm. In some embodiments, the coating may have a thickness of less than about 1 mm to about 25 mm. In some embodiments, the coating may have a thickness of less than about 10 mm. In some embodiments, the coating may have a thickness of less than about 5 mm.

In another aspect, the present technology provides a single pack coating kit. The single pack coating kit includes a composition that includes Portland cement, a melamine, and alumina. In some embodiments, the composition may further include silicon dioxide. The silicon dioxide may be quartz silica sand. In some embodiments, the quartz silica sand may be about 8 to 100 mesh. In some embodiments, the quartz silica sand may be about 16 to 70 mesh. In some embodiments, the composition may further include a supplementary cementitious material. The supplementary cementitious material may be selected from the group consisting of pozzolans, fly ash, slags, metallurgical slags, bottom ash, chemically modified coal ash, ground glass, heat treated clays, heat treated shale, heat treated siliceous rocks, metakaolin, ground granulated blast-furnace slag (GGBFS), steel slag, natural pozzolans, artificial pozzolans, limestone, ground limestone, ground quartz, ground filler materials, biomass ash, pulverized fuel ash, calcium sulphoaluminate cement, and combinations thereof. In some embodiments, the supplementary cementitious material may be selected from the group consisting of fly ash, steel slag, silica fume, metastable forms of $CaCO_3$, ground limestone, ground quartz, precipitated $CaCO_3$, calcium sulphoaluminate cement, and combinations thereof. In some embodiments, the supplementary cementitious material may be fly ash. In some embodiments, the fly ash may be Class C or F fly ash. In some embodiments, the Portland cement may be selected from the group consisting of Type I, Type II, and combinations thereof. In some embodiments, the melamine may include a sulphonated melamine formaldehyde polymer. In some embodiments, the ratio of melamine to Portland cement may be about 1:25 to about 1:500. In some embodiments, the ratio of Portland cement to melamine may be about 1:40 to about 1:400. In some embodiments, the ratio of Portland cement to melamine may be about 1:50 to about 1:200. In some embodiments, the alumina may be selected from the group consisting of crystalline aluminum oxide, amorphous aluminum oxide, calcined alumina, or combinations thereof. In some embodiments, the alumina may be calcined. In some embodiments, the alumina may be aluminum oxide. In some embodiments, the aluminum oxide may be crystalline. In some embodiments, the aluminum oxide may be amorphous. In some embodiments, the aluminum oxide may be a powder. In some embodiments, the aluminum oxide may be a slurry. In some embodiments, the ratio of alumina to Portland cement may be about 1:5 to about 1:50. In some embodiments, the ratio of Portland cement to alumina may be about 1:10 to about 1:30. In some embodiments, the ratio of Portland cement to alumina may be about 1:15 to about 1:25. In one embodiment, the composition may further include a first water redispersable powder resin. The first water redispersable powder resin may include the polymerized monomers of styrene; and one or more monomers selected from the group consisting of vinyl ester, acrylic acid, methacrylic acid, and acrylate. In some embodiments, the acrylate may be selected from the group consisting of methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and combinations thereof. In some embodiments, the vinyl ester may be selected from the group consisting of vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 9 to 11 carbon atoms, and combinations thereof. In some embodiments, the first water redispersable powder resin may include the polymerized monomers of styrene and acrylate. In some embodiments, the acrylate may be n-butyl acrylate. The composition may further include a second water redispersable powder resin. In some embodiments, the second water redispersable powder resin includes the polymerized monomers of ethylene; and one or more monomers selected from the group consisting of vinyl acetate, acrylic acid, methacrylic acid, and acrylate. In some embodiments, the acrylate may be selected from the group consisting of methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and combinations thereof. In some embodiments, the vinyl ester may be selected from the group consisting of vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 9 to 11 carbon atoms, and combinations thereof. In some embodiments, the second water redispersable powder resin may include the polymerized monomers of ethylene and vinyl acetate. In some embodiments, the composition may further include water. In some embodiments, the composition may further include hydrophobizers, preservatives, film-forming assistants, dispersants, foam stabilizers, defoamers, or combinations thereof. In some embodiments, the composition may further include pigments and/or dyes. In some embodiments, the pigment may be selected from the group consisting of titanium dioxide, carbon black, inorganic iron oxides, and combinations thereof.

In another aspect, the present technology provides a 2-pack coating kit, wherein the second pack include an acrylic polymer and the first pack includes a composition that includes Portland cement, a melamine, and alumina. In some embodiments, the composition may further include silicon dioxide. The silicon dioxide may be quartz silica sand. In some embodiments, the quartz silica sand may be about 8 to 100 mesh. In some embodiments, the quartz silica sand may be about 16 to 70 mesh. In some embodiments, the composition may further include a supplementary cementitious material. The supplementary cementitious material may be selected from the group consisting of pozzolans, fly ash, slags, metallurgical slags, bottom ash, chemically modified coal ash, ground glass, heat treated clays, heat treated shale, heat treated siliceous rocks, metakaolin, ground granulated blast-furnace slag (GGBFS), steel slag, natural pozzolans, artificial pozzolans, limestone, ground limestone, ground quartz, ground filler materials, biomass ash, pulverized fuel ash, calcium sulphoaluminate cement, and combinations thereof. In some embodiments, the supplementary cementitious material may be selected from the group consisting of fly ash, steel slag, silica fume, metastable forms of $CaCO_3$, ground limestone, ground quartz, precipitated $CaCO_3$, calcium sulphoaluminate cement, and combinations thereof. In some embodiments, the supplementary cementitious material may be fly ash. In some embodiments, the fly ash may be Class C or F fly ash. In some embodiments, the Portland cement may be selected from the group consisting of Type I, Type II, and combinations thereof. In some embodiments, the melamine may include a sulphonated melamine formaldehyde polymer. In some embodiments, the ratio of melamine to Portland cement may be about 1:25 to about 1:500. In some embodiments, the ratio of Portland cement to melamine may be about 1:40 to about 1:400. In some embodiments, the ratio of Portland cement to melamine may be about 1:50 to about 1:200. In some embodiments, the alumina may be selected from the group consisting of crystalline aluminum oxide, amorphous aluminum oxide, calcined alumina, or combinations thereof. In some embodiments, the alumina may be calcined. In some embodiments, the alumina may be aluminum oxide. In some embodiments, the aluminum oxide may be crystalline. In some embodiments, the aluminum oxide may be amorphous. In some embodiments, the aluminum oxide may be a powder. In some embodiments, the aluminum oxide may be a slurry. In some embodiments, the ratio of alumina to Portland cement may be about 1:5 to about 1:50. In some embodiments, the ratio of Portland cement to alumina may be about 1:10 to about 1:30. In some embodiments, the ratio of Portland cement to alumina may be about 1:15 to about 1:25. In some embodiments, the composition may further include water. In some embodiments, the composition may further include hydrophobizers, preservatives, film-forming assistants, dispersants, foam stabilizers, defoamers, or combinations thereof. In some embodiments, the composition may further include pigments and/or dyes. In some embodiments, the pigment may be selected from the group consisting of titanium dioxide, carbon black, inorganic iron oxides, and combinations thereof. In some embodiments, the acrylic polymer may be a carboxylated acrylic copolymer. In some embodiments, the acrylic polymer may have a solids content of about 40-60 wt %. In some embodiments, the acrylic polymer may have a solids content of about 46-48 wt %. In some embodiments, the acrylic polymer may include a less than about 0.2 wt % ammonia. In some embodiments, the acrylic polymer may include a less than about 200 ppm butyl acrylate. In some embodiments, the acrylic polymer may include about 40-60 wt % water.

In one aspect, the present technology provides a method for producing a concrete composition, the method including: (a) blending component I; (b) adding component II; and (c) blending; wherein component I includes a melamine and alumina; and component II includes Portland cement. In some embodiments, the method further includes: (d) adding silicon dioxide; and (e) blending. In some embodiments, the blending temperature may be below about 200° F. In some embodiments, the blending temperature may be below about 180° F. In some embodiments, the blending temperature may be less than or equal to about 160° F. In some embodiments, the silicon dioxide may be quartz silica sand. In some embodiments, component II further includes a supplementary cementitious material. The supplementary cementitious material may be selected from the group consisting of pozzolans, fly ash, slags, metallurgical slags, bottom ash, chemically modified coal ash, ground glass, heat treated clays, heat treated shale, heat treated siliceous rocks, metakaolin, ground granulated blast-furnace slag (GGBFS), steel slag, natural pozzolans, artificial pozzolans, limestone, ground limestone, ground quartz, ground filler materials, biomass ash, pulverized fuel ash, calcium sulphoaluminate cement, and combinations thereof. In some embodiments, the supplementary cementitious material may be selected from the group consisting of fly ash, steel slag, silica fume, metastable forms of CaCO3, ground limestone, ground quartz, precipitated CaCO3, and combinations thereof. In some embodiments, the supplementary cementitious material may be fly ash. In some embodiments, the fly ash may be Class C or F fly ash. In some embodiments, the Portland cement may be selected from the group consisting of Type I, Type II, and combinations thereof. In some embodiments, the melamine may include a sulphonated melamine formaldehyde polymer. In some embodiments, the melamine may further include an acrylic polymer salt (e.g., sodium salt), a polycarboxylate ether (PCE) superplasticizer, or combinations thereof. In some embodiments, the alumina may be selected from the group consisting of crystalline aluminum oxide, amorphous aluminum oxide, calcined alumina, or combinations thereof. In some embodiments, the alumina may be calcined. In some embodiments, the alumina may be aluminum oxide. In some embodiments, the aluminum oxide may be crystalline. In some embodiments, the aluminum oxide may be amorphous. In some embodiments, the aluminum oxide may be a powder. In some embodiments, the aluminum oxide may be a slurry. In some embodiments, the ratio of alumina to Portland cement may be about 1:5 to about 1:50. In some embodiments, the ratio of alumina to Portland cement may be about 1:10 to about 1:30. In some embodiments, the ratio of alumina to Portland cement may be about 1:15 to about 1:25. In some embodiments, the ratio of melamine to Portland cement may be about 1:25 to about 1:500. In some embodiments, the ratio of melamine to Portland cement may be about 1:40 to about 1:400. In some embodiments, the ratio of melamine to Portland cement may be about 1:50 to about 1:200.

In one embodiment, the component II may further include a first water redispersible powder resin. In some embodiments, the first water redispersable powder resin may include the polymerized monomers of styrene; and one or more monomers selected from the group consisting of vinyl ester, acrylic acid, methacrylic acid, and acrylate. In some embodiments, the acrylate may be selected from the group consisting of methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and combinations thereof. In some embodiments, the vinyl ester may be selected from the group consisting of vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 9 to 11 carbon atoms, and combinations thereof. In some embodiments, the first water redispersable powder resin may include the polymerized monomers of styrene and acrylate. In some embodiments, the acrylate is n-butyl acrylate. In some embodiments, component II may further include a second water redispersible powder resin. In some embodiments, the second water redispersable powder resin may include the polymerized monomers of ethylene; and one or more monomers selected from the group consisting of vinyl acetate, acrylic acid, methacrylic acid, and acrylate. In some embodiments, the acrylate may be selected from the group consisting of methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, and combinations thereof. In some embodiments, the vinyl ester may be selected from the group consisting of vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 9 to 11 carbon atoms, and combinations thereof. In some embodiments, the second water redispersable powder resin may include the polymerized monomers of ethylene and vinyl acetate. In some embodiments, component I may further include hydrophobizers, preservatives, film-forming assistants, dispersants, foam stabilizers, defoamers, or combinations thereof. In some embodiments, the method may further include: (f) adding component IIIA; and (g) blending; wherein IIIA includes water. In some embodiments, component I may further include pigments and/or dyes. In some embodiments, the pigment may be selected from the group consisting of titanium dioxide, carbon black, inorganic iron oxides, or combinations thereof.

In another embodiment, the method may further include: (f) adding component IIIB; and (g) blending; wherein component IIIB includes an acrylic polymer. In some embodiments, the acrylic polymer may be a carboxylated acrylic copolymer. In some embodiments, the acrylic polymer may have a solids content of about 40-60 wt %. In some embodiments, the acrylic polymer may have a solids content of about 46-48 wt %. In some embodiments, the acrylic polymer may include a less than about 0.2 wt % ammonia. In some embodiments, the acrylic polymer may include a less than about 200 ppm butyl acrylate. In some embodiments, the acrylic polymer may include about 40-60 wt % water. In some embodiments, component IIIB may further include hydrophobizers, preservatives, film-forming assistants, dispersants, foam stabilizers, defoamers, or combinations thereof. In some embodiments, component IIIB may further include water. In some embodiments, component IIIB may further include pigments and/or dyes. In some embodiments, the pigment may be selected from the group consisting of titanium dioxide, carbon black, inorganic iron oxides, or combinations thereof.

While certain embodiments have been illustrated and described, it should be understood that changes and modifications can be made therein in accordance with ordinary skill in the art without departing from the technology in its broader aspects.

The embodiments, illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. A pavement preservation material for use on pavement having a composition comprising:
   a. Portland cement, melamine, aluminum oxide, sand, defoamer, non-aluminum metal oxide, pozzolan, and water;
   b. wherein the composition contains between 20.0% and 25.0% by weight Portland cement;
   c. wherein the composition contains between 0.1% and 1.0% by weight melamine;
   d. wherein the composition contains between 1.0% and 2.5% by weight of aluminum oxide;
   e. wherein the composition contains between 40% and 65% by weight sand;
   f. wherein the composition contains between 0.1 and 1.0% by weight defoamer;
   g. wherein the composition contains between 7% and 12% by weight non-aluminum metal oxide;
   h. wherein the composition contains between 7% and 9% by weight pozzolan;
   i. wherein the composition has a thickness between 1 mm and 100 mm;
   j. wherein said pavement preservation material bonds to either concrete or asphalt; and wherein the weight percentages are based on the total weight of the composition.

2. The composition in accordance with claim 1, wherein the sand is quartz silica sand.

3. The composition in accordance with claim 2, further comprising: an acrylic polymer.

4. The composition in accordance with claim 3, wherein the melamine further comprises a sulphonated melamine formaldehyde polymer.

5. A composition comprising:
   a. Portland cement, melamine, aluminum oxide, sand, defoamer, non-aluminum metal oxide, pozzolan, and water;
   b. wherein the composition contains between 20.0% and 25.0% by weight Portland cement;
   c. wherein the composition contains between 0.1% and 1.0% by weight melamine;
   d. wherein the composition contains between 1.0% and 2.5% by weight of aluminum oxide;
   e. wherein the composition contains between 40% and 65% by weight sand;
   f. wherein the composition contains between 0.1 and 1.0% by weight defoamer;
   g. wherein the composition contains between 7% and 12% by weight non-aluminum metal oxide; and
   h. wherein the composition has a thickness between 1 mm and 100 mm;
   i. wherein said pavement preservation material bonds to either concrete or asphalt; and wherein the weight percentages are based on the total weight of the composition.

6. The composition in accordance with claim 5, wherein the sand further comprises quartz silica sand.

7. The composition in accordance with claim 5, wherein the sand is quartz silica sand.

8. The composition in accordance with claim 5, further comprising: an acrylic polymer.

9. The composition in accordance with claim 5, wherein the melamine further comprises a sulphonated melamine formaldehyde polymer.

10. A pavement preservation material for use on pavement having a composition comprising:
    a. Portland cement, melamine, aluminum oxide, sand, defoamer, non-aluminum metal oxide, pozzolan, and water;
    b. wherein the composition contains between 20.0% and 25.0% by weight Portland cement;
    c. wherein the composition contains between 0.1% and 1.0% by weight melamine;
    d. wherein the composition contains between 1.0% and 2.5% by weight aluminum oxide;
    e. wherein the composition contains between 40% and 65% by weight sand;
    i. wherein the composition contains between 0.1 and 1.0% by weight defoamer;
    f. wherein the composition contains between 7% and 12% by weight non-aluminum metal oxide;
    g. wherein the composition contains between 7% and 9% by weight pozzolan;
    h. wherein the composition contains an acrylic polymer and bonds to both asphalt and concrete; and wherein the weight percentages are based on the total weight of the composition.

11. The composition in accordance with claim 10, wherein the sand is quartz silica sand.

12. The composition in accordance with claim 10, further comprising: an acrylic polymer.

13. A coating comprising the composition of claim 10.

14. The coating in accordance with claim 13 has a thickness between 1 mm and 100 mm.

* * * * *